(12) United States Patent
Koc

(10) Patent No.: US 8,023,834 B2
(45) Date of Patent: Sep. 20, 2011

(54) ADAPTIVE POLARIZATION TRACKING AND EQUALIZATION IN COHERENT OPTICAL RECEIVERS

(75) Inventor: Ut-Va Koc, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/779,448

(22) Filed: May 13, 2010

(65) Prior Publication Data
US 2010/0221020 A1    Sep. 2, 2010

Related U.S. Application Data

(62) Division of application No. 11/644,555, filed on Dec. 22, 2006, now Pat. No. 7,747,169.

(51) Int. Cl.
*H04B 10/06* (2006.01)
(52) U.S. Cl. .......... 398/202; 398/208; 398/205
(58) Field of Classification Search .......... 398/65, 398/74, 77, 152, 158, 159, 192–194, 199
See application file for complete search history.

(56) References Cited

U.S. PATENT DOCUMENTS

| | | | |
|---|---|---|---|
| 6,782,211 | B1 | 8/2004 | Core |
| 6,917,031 | B1 | 7/2005 | Sun et al. |
| 7,315,575 | B2 * | 1/2008 | Sun et al. ............ 375/229 |
| 7,509,054 | B2 * | 3/2009 | Calabro et al. ........ 398/152 |
| 2004/0114939 | A1 | 6/2004 | Taylor | |
| 2007/0036555 | A1 | 2/2007 | Chen et al. | |
| 2007/0110362 | A1 | 5/2007 | Shpantzer et al. | |

OTHER PUBLICATIONS

F. Derr, "Optical QPSK Transmission System With Novel Digital Receiver Concept," Electronics Letters, vol. 27, No. 23, pp. 2177-2179, Nov. 7, 1991.
U-V. Koc et al, "Digital Coherent Quadrature Phase-Shift-Keying (QPSK)," in Proc. Optical Fiber Conference and the 2006 National Fiber Optic Engineers Conference (OFC), Anaheim, CA, Mar. 5-10, 2006, 3 pages.
D-S, Ly-Gagnon et al, "Coherent Detection of Optical Quadrature Phase-Shift Keying Signals With Carrier Phase Estimation," Journal of Lightwave Technology, vol. 24, No. 1, Jan. 2006, pp. 12-21.
T. Pfau, et al, "First Real-Time Data Recovery for Synchronous QPSK Transmission With Standard DFB Lasers," IEEE Photonics Technology Letters, vol. 18, No. 18, Sep. 15, 2006, pp. 1907-1909.
M.G. Taylor, "Accurate Digital Phase Estimation Process for Coherent Detection Using a Parallel Digital Processor," in Proc. European Conference, Optical Communication, ECOC 2005 Proceedings—vol. 2, Glasgow, UK., pp. 263-264.

(Continued)

*Primary Examiner* — Dalzid Singh
(74) *Attorney, Agent, or Firm* — John F. McCabe

(57) ABSTRACT

A method for operating an optical receiver includes at each of a sequence of sampling times, producing a first 2D complex digital signal vector whose first component is indicative of a phase and amplitude of one polarization component of a modulated optical carrier and whose second component is indicative of a phase and amplitude of another polarization component of the carrier. For each one of the sampling times, the method includes constructing a second 2D complex digital signal vector that is a rotation of the first 2D complex digital vector for the one of sampling times. The rotation compensates a polarization rotation produced by transmission of the modulated optical carrier between an optical transmitter and the optical receiver.

4 Claims, 15 Drawing Sheets

OTHER PUBLICATIONS

H. Meyr, et al, Digital Communication Receivers, Synchronization, Channel Estimation, And Signal Processing, John Wiley & Sons, Inc., New York, 1998 ch. 8 2 2 , pp. 457-463.

Reinhold Noe, "Phase Noise-Tolerant Synchronous QPSK/BPSK Baseband-Type Intradyne Receiver Concept With Feedforward Carrier Recovery", Journal of Lightwave Technology, vol. 23., No, 2, Feb. 2005, pp. 802-808.

Yan Han and Guifang Li, "Coherent Optical Communication Using Polarization Multiple-Input-Multiple-Output", Optics Express, Sep. 19, 2005/vol. 13, No. 19, pp. 7527-7534.

Andreas Leven, et al, "Frequency Estimation in Intradyne Reception," IEEE Photonics Technology Letters, vol. 19, No. 6, Mar. 15, 2007, pp. 366-368.

N. Kaneda et al, "System and Method for Receiving Coherent, Polarization-Multiplexed Optical Signals", Filing date: Jun. 23, 2006, U.S. Appl. No. 11/426,191, 25 pages.

Ut-Va Koc, "Recursive Phase Estimation for a Phase-Shift-Keying Receiver", Filing Date: Jul. 7, 2006, U.S. Appl. No. 11/483,280, 27 pages.

Y-K Chen et al, "Frequency Estimation in an Intradyne Optical Receiver", Filing Date: Dec. 22, 2006, U.S. Appl. No. 11/644,536, 29 pages.

PCT International Search Report dated May 15, 2008 (PCT/US2007/025214) 3 pages.

Zhi Ding et al, "I11-Convergence of Godard Blind Equalizers in Data Communication Systems", IEEE Transactions on Communications, vol. 39, No. 9 (Sep. 1991) pp. 1313-1327.

Dominique N. Godard, "Self-Recovering Equalization and Carrier Tracking in Two-Dimensional Data Communication Systems", IEEE Transactions on Communications, vol. COM-28, No. 11 (Nov. 1980) pp. 1867-1875.

"Adaptive equalizer", from Wikipedia, the free encyclopedia, available online at: http://en.wikipedia.org/w/index.php?title=Adaptive_equalizer&oldid=9267569, Dec. 28, 2004, 1 page.

"Recursive least squares filter", from Wikipedia, the free encyclopedia, available online at: http://en.wikipedia.org/w/index.php?title=Recursive_least_squares_filter&oldid=72784592, Aug. 30, 2006, 7 pages.

"Least mean squares filter", from Wikipedia, the free encyclopedia, available online at: http://en.wikipedia.org/w/index.php?title=Least_mean_squares_filter&oldid=94999415, Dec. 18, 2006, 6 pages.

* cited by examiner

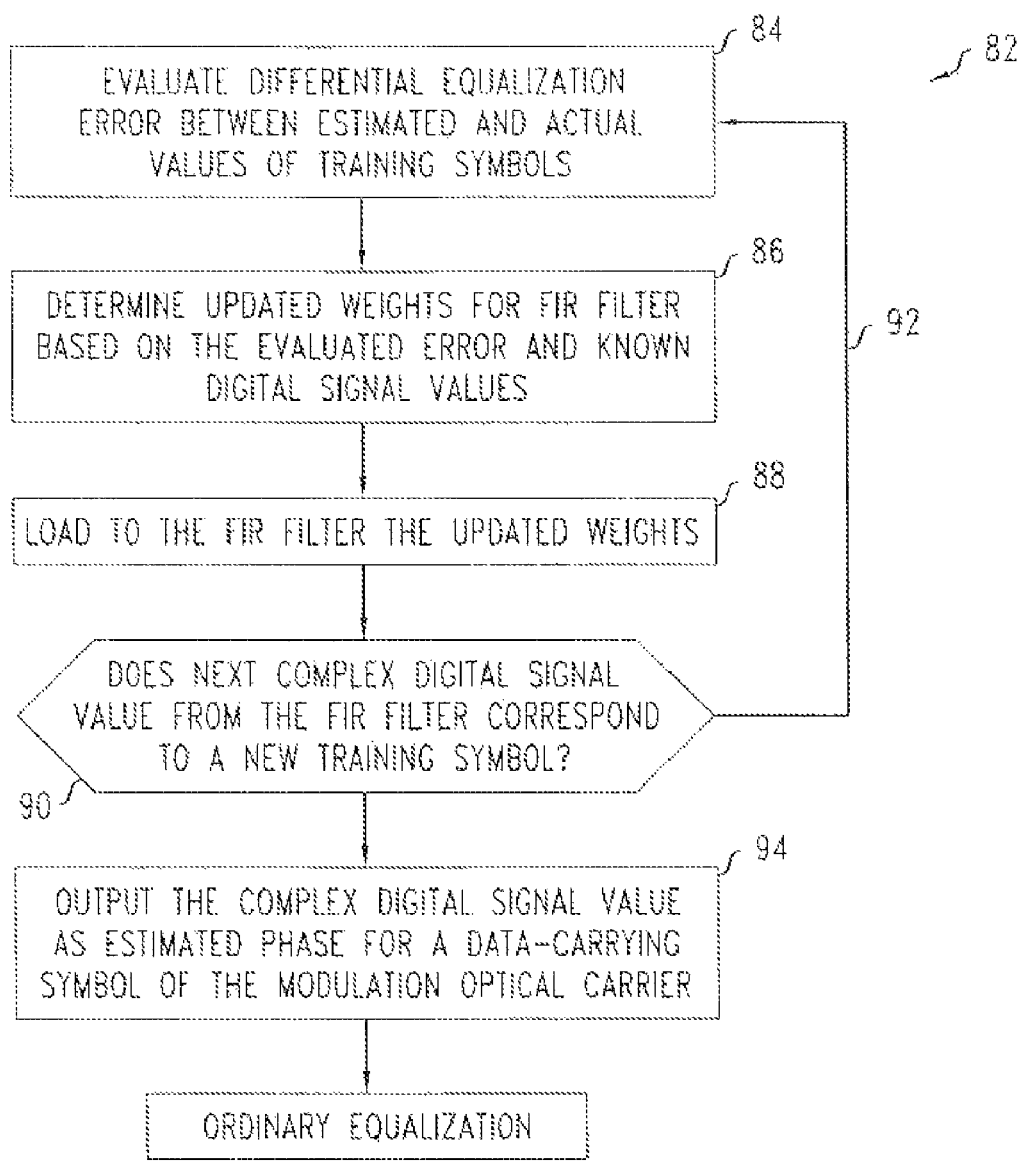

ADAPTIVE POLARIZATION TRACKING AND EQUALIZATION IN COHERENT OPTICAL RECEIVERS

This is a divisional of patent application Ser. No. 11/644,555, filed Dec. 22, 2006 now U.S. Pat. No. 7,747,169.

BACKGROUND

1. Field of the Invention

The invention relates to coherent optical receivers and methods of operating coherent optical receivers.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

In optical communication systems, a variety of schemes have been considered for implementing coherent detection. While homodyne detection is often desirable, there is a significant difficulty with implementing homodyne detection in optical communications systems at high data rates. Homodyne detection involves phase locking to the received carrier, and phase locking is often complex to achieve for an optical carrier. Partially due to this deficiency of optical homodyne detection, heterodyne and intradyne detection have also been considered for coherent optical receivers.

In intradyne detection, the receiver uses a local oscillator to down mix the data-carrying carrier. Nevertheless, the local oscillator of the receiver is not tightly phase or frequency locked to the data-carrying optical carrier. Instead, the local oscillator of the receiver has a frequency that loosely configured to be closer to the frequency of the data-carrying carrier than the bandwidth of the data-carrying carrier. Thus, an intradyne optical receiver would not typically have an optical phase locked loop. Due to the absence of optical phase locked loops, intradyne optical receivers may offer advantages in coherent optical detection.

Coherent detection may be used to recover data transmitted via a phase-shift-keying (PSK) modulation scheme. Nevertheless, the performance of a receiver of PSK modulated data is typically sensitive to frequency offsets and carrier linewidths. For that reason, efficiently implementing an intradyne optical receiver for PSK modulated optical carriers has posed some challenges.

BRIEF SUMMARY

Various embodiments use digital signal processing to handle issues associated with recovering data from optical carriers that are modulated via phase-shift-keying (PSK). Through digital signal processing, some embodiments provide for adaptive polarization tracking, and some embodiments provide for adaptive equalization. Such digital signal processing may compensate for optical inter-symbol interference (OISI) even when the optical communications channel causes the carrier's polarization to vary in time and/or introduces a polarization-dependent phase shift.

Herein, a hybrid optical detector has one or more optical ports for inputting light with one or more properties to be measured and includes one or more electrical output ports for outputting one or more electrical signals indicative of the value(s) of the one or more properties for the light input to the one or more optical ports.

One embodiment features an apparatus that includes an optical receiver configured to recover data from a PSK modulated optical carrier. The optical receiver includes an optical detector and a digital processor. The optical detector is configured to produce a sequence of vectors having first and second digital components. Each first component is indicative of a complex value of a first polarization component of the modulated optical carrier at a corresponding sampling time. Each second component is indicative of a complex value of a different second polarization component of the modulated optical carrier at the sampling time. The digital processor is connected to receive the vectors and is configured to perform a rotation on each received vector individually in a manner that compensates for polarization rotations produced by transmitting the modulated optical carrier from an optical transmitter thereof to the optical receiver.

In some embodiments of the apparatus, the digital processor is configured to iteratively update each angle of the rotation by an amount proportional to a difference between magnitudes of the components of a vector produced by an earlier one of the rotations. The digital processor may be configured to evaluate an error in the amplitude of one of the components of the rotated vectors. The digital processor may be configured to equalize the first components of the rotated vectors based on differential phase errors between successive ones of the first components of the rotated vectors. The digital processor may also be configured to equalize the second components of the rotated vectors based on differential phase errors between successive ones of the second components of the rotated vectors.

In some embodiments of the apparatus, the digital processor is configured to rotate the received vectors without performing cross equalization between the first and second components of the vectors.

In some embodiments of the apparatus, the processor is configured to perform the rotations in a manner that tends to equalize amplitudes of the first second components.

In some embodiments of the apparatus, the hybrid optical detector includes an optical hybrid configured to output first mixtures of the modulated optical carrier and a reference optical carrier at first outputs and to output second mixtures of the carriers having different relative phases at second outputs. In such embodiments, the digital processor may be configured to equalize the first components of the rotated vectors based on evaluated differential phase errors between successive ones of the first components of the rotated vectors.

Another embodiment features an apparatus including an optical receiver configured to recover data PSK modulated onto a received optical carrier. The optical receiver includes an optical detector and a digital processor. The optical detector is configured to produce a sequence of vectors having first digital electrical signal components. Each first electrical digital signal component is indicative of a value of one polarization component of the received optical carrier at a corresponding sampling time. The digital signal processor is connected to receive the first digital electrical signal components and to equalize the first digital electrical signal components in a manner responsive to differential phase errors between successive ones of the first digital electrical signal components.

In some embodiments of the apparatus, the optical detector is configured to produce second digital electrical signal components of the vectors. Each second digital electrical signal component is indicative of a value of another polarization component of the received optical carrier at the corresponding sampling time. The digital processor may be configured to equalize the second digital electrical signal components in a manner responsive to differential phase errors between successive ones of the second digital electrical signal components.

In some embodiments of the apparatus, the digital processor may include a device configured to function as a FIR filter that equalizes the first digital electrical signal components by producing a weighted sum of (2L+1) successive ones of the first digital electrical signal components, wherein L is greater than or equal to one. The digital processor may also include a weight updating device that is configured to update weights defining the sum based on the differential phase error.

Another embodiment features a method for operating an optical receiver. The method includes at each of a sequence of sampling times, producing a first 2D complex digital signal vector whose first component is indicative of a phase and amplitude of one polarization component of a modulated optical carrier and whose second component is indicative of a phase and amplitude of another polarization component of the carrier. For each one of the sampling times, the method includes constructing a second 2D complex digital signal vector that is a rotation of the first 2D complex digital vector for the one of sampling times. The rotation compensates a polarization rotation produced by transmission of the modulated optical carrier between an optical transmitter and the optical receiver.

In some embodiments, the method further includes iteratively updating each angle of the rotation by an amount proportional to a difference between magnitudes of the components of a vector produced by an earlier one of the rotations.

In some embodiments, the method further includes prior to one of the acts of constructing, updating a form of the rotation for the one of the acts of constructing such that said one of the acts of constructing produces a second 2D complex digital signal vector whose first and second components have better equalized amplitudes.

In some embodiments, the method further includes equalizing first components of the second 2D digital signal complex vectors based on differential phase errors between successive ones of the first components of the second 2D complex digital signal vectors. The method may be such that the equalizing of each first component includes producing a weighted sum of (2L+1) successive ones of the first components of the second 2D complex digital signal vectors, wherein L is greater than or equal to one.

BRIEF DESCRIPTION OF THE DRAWINGS

FIG. 9 is a block diagram illustrating one method of updating the weight coefficients of the FIR filter in the ODLF equalizer of FIG. 7.

In the Figures and text, like reference numerals indicate elements with similar functions.

In the Figures, the relative dimensions of some features may be exaggerated to more clearly illustrate one or more of the structures therein.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

Methods and apparatus for optical data transmission and coherent optical reception, which may be useful in embodiments herein, are described in U.S. patent application Ser. No. 11/204,607, which was filed on Aug. 15, 2005, by Young-Kai Chen et al and is incorporated herein by reference in its entirety. Herein, this U.S. patent application of Y. K. Chen et al will be referred to at the '607 Application.

An optical receiver converts a received PSK modulated optical carrier into a stream of digital data symbols. To efficiently do such conversion, some embodiments of the intradyne optical receivers described herein may include one or more specific adaptations. One specific adaptation is directed towards compensating for the lack of frequency and phase synchronization between the local optical oscillator of the intradyne optical receiver and the modulated optical carrier. Another specific adaptation is directed towards compensating or correcting a lack of polarization lock between the optical receiver's local optical oscillator and the modulated optical carrier. One or more specific adaptations are also directed towards compensating for or correcting one or more of the degradations to the modulated optical carrier, which are produced by the optical communications channel. These degradations may include amplified spontaneous emission (ASE) noise, which is produced by in-line optical amplifiers and/or optical inter-symbol interference, which may be caused by chromatic dispersion or polarization mode dispersion (PMD), and polarization rotations, which were caused by PMD.

Figure 1A:
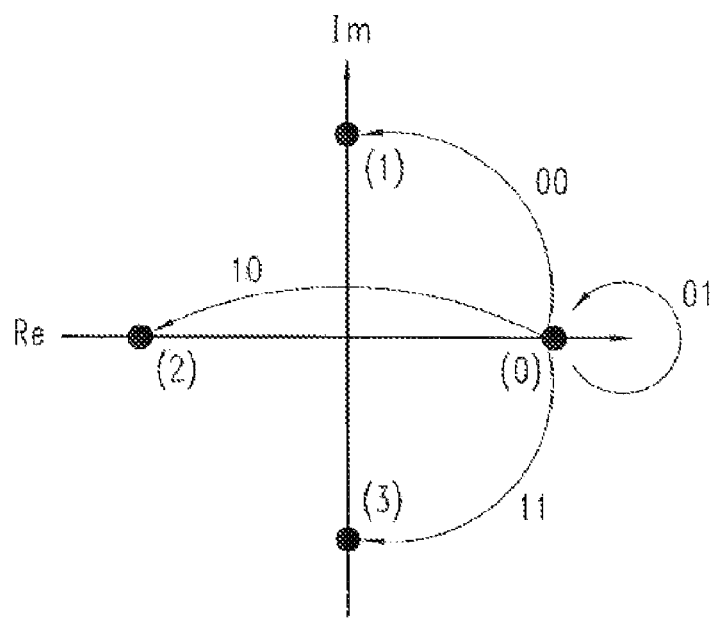
FIGS. 1A, 1B, and 1C illustrate quadrature PSK (QPSK), eight PSK (8 PSK), and sixteen PSK (16 PSK) symbol constellations that may be implemented in the embodiments described herein.
Figure 1B:
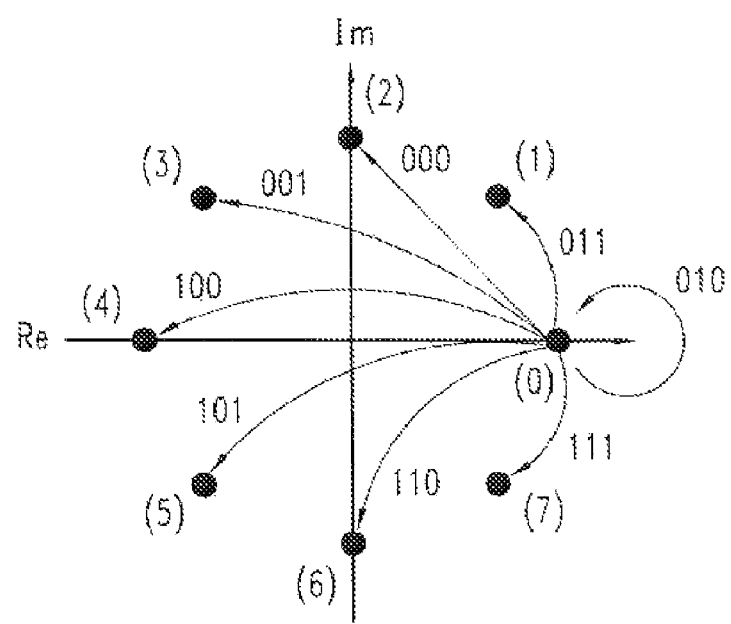
Figure 1C:
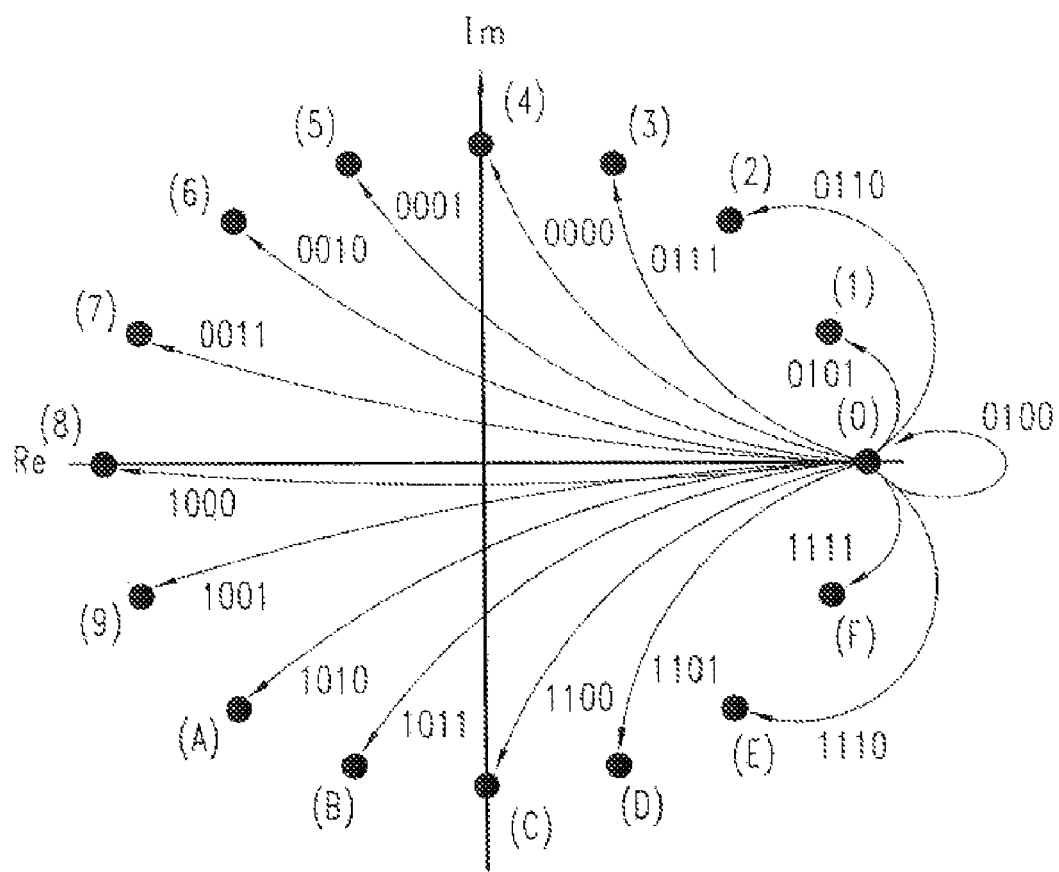

FIGS. 1A-1C illustrate a few symbol constellations that may be used to modulate data onto the optical carrier in optical communications systems described herein. The constellations include a quadrature PSK (QPSK) constellation of FIG. 1A, an eight PSK (8 PSK) constellation of FIG. 1B, and a sixteen PSK (16 PSK) constellation of FIG. 1C. The QPSK, 8 PSK, and 15 PSK constellations have 4, 8, and 16 symbols, respectively, which are shown as points (1), (2), . . . , (16) in the complex plane. In the various embodiments, the symbols of the selected PSK constellation are modulated onto the phase of the optical carrier, i.e., as a factor of the form exp $(i\theta_S)$. For the QPSK, 8 PSK, and 16 PSK constellations, the variable $\theta_S$ may belong to $\{0, \pi/2, \pi, 3\pi/2\}$, $\{0, \pi/4, \pi/2, 3\pi/4, \pi, 5\pi/4, 3\pi/2, 7\pi/4\}$, and $\{0, \pi/8, \pi/4, 3\pi/8, \ldots, 15\pi/8\}$, respectively. In various embodiments, the symbols of these PSK constellations may also be used to differentially encode data words with 2, 3, and 4 bits, respectively, e.g., as by the mappings of 2, 3, and 4 bit words in FIGS. 1A-1C.

Figure 2:
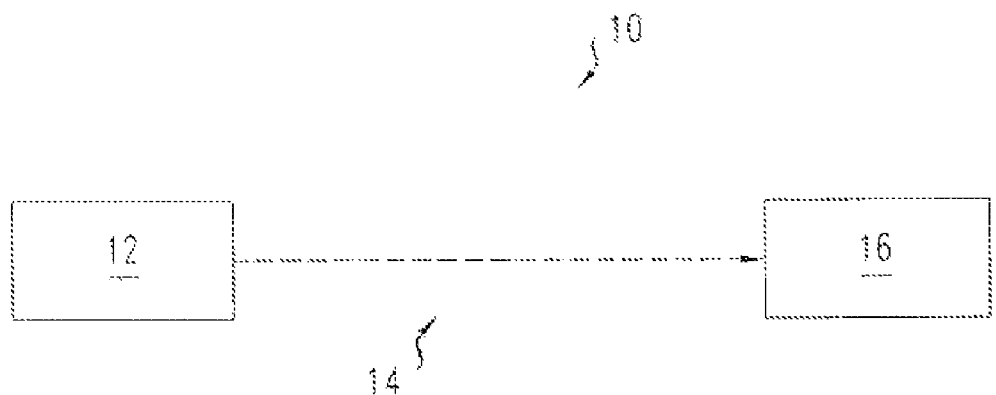
FIG. 2 is a block diagram illustrating an optical communication system.

FIG. 2 illustrates generally an optical communications system 10 in which a PSK modulated optical carrier communicates the data. The optical communications system 10 includes an optical transmitter 12, an optical communications channel 14, and an optical receiver 16. The optical transmitter 12 modulates a continuous light wave to have a sequence of symbols in a selected PSK format, e.g., QPSK, 8 PSK, or 16 PSK. The optical transmitter 12 may PSK modulate optical pulses having a non-return-to-zero (NRZ) or a return-to-zero (RZ) format. The optical transmitter 12 either modulates one PSK symbol stream onto the linear polarization component(s) of the optical carrier or modulates an independent PSK symbol stream onto each of the linear polarization components of the optical carrier. The later technique is known as polarization multiplexing. The optical communications channel 14 transports the PSK modulated optical carrier from the optical transmitter 12 to the optical receiver 16. The optical communications channel 14 may include a free-space optical link and/or a single or multi-span optical or all-optical fiber transmission line. The optical receiver 16 recovers one or two estimated symbol streams from the modulated optical carrier that is received from the optical communications channel 14, i.e., depending on whether the optical carrier has been polarization multiplexed.

Figure 3A:
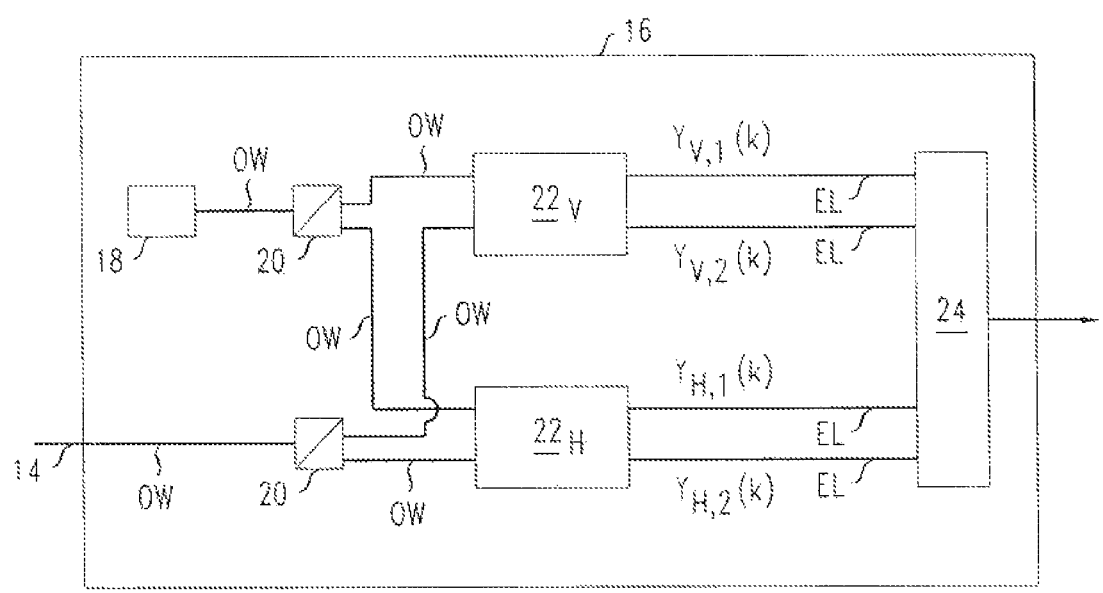
FIG. 3A is a block diagram illustrating one embodiment of the coherent optical receiver shown in FIG. 2.

FIG. 3A illustrates one embodiment of the optical receiver 16 of FIG. 2. The optical receiver 16 includes a local optical oscillator 18, two optical polarization splitters 20, two 2×2 hybrid optical detectors $22_V$, $22_H$, a digital signal processor (DSP) 24, and a plurality of optical waveguides (OWs) and electrical lines (ELs) that connect elements 18, 20, $22_V$, $22_H$, 24 therein. Herein, the letters "V" and "H" will be used to designate tow different linear polarization components, e.g., the mutually orthogonal "vertical" and "horizontal" components of a lab frame.

The local optical oscillator 18 produces a continuous-wave (CW) reference optical carrier at about the wavelength of the optical carrier that is received from the optical communications channel 14. The local optical oscillator 18 is a coherent light source, e.g., an environmentally stabilized diode laser. The local optical oscillator 18 will frequency down-mix the received optical carrier in the hybrid optical detectors $22_V$, $22_H$. For that reason, the local optical oscillator 18 is setup to output the reference optical carrier with a frequency, $\omega_{RC}$, that is approximately equal to the frequency, $\omega_{MC}$, of the modulated optical carrier received from the optical communications channel 14. Nevertheless, the optical receiver 16 does not have an optical phase lock loop (PLL) that tightly locks the phase of CW reference optical carrier to the phase of the modulated optical carrier that is received from the optical communications channel 14. Indeed, line widths of the light from the local optical oscillator 18 and/or the optical transmitter 12 may produce frequency variations sufficient to destroy any such tight phase synchronization between the modulated and reference optical carriers. Thus, the reference optical carrier and modulated optical carrier may have a phase offset that drifts substantially in time.

Even in the absence of frequency locking, some embodiments of the optical receiver 16 may be able to function as intradyne detectors. In these embodiments, the optical transmitter 12 may use, e.g., a frequency-stabilized light source to produce the optical carrier, and the local optical oscillator 18 may use, e.g., a frequency-stabilized light source to produce the reference optical carrier.

The two optical polarization splitters 20 separate the reference optical carrier from the local optical oscillator 18 and the modulated optical carrier from the optical communications channel 14 into linear polarization components "H" and "V", which are substantially orthogonal, e.g., the "vertical" and "horizontal" components in a lab frame. Each optical polarization splitter 20 transmits light of the V linear polarization component to one optical input of the 2×2 hybrid optical detector $22_V$ and transmits light of the substantially orthogonal H linear polarization to one optical input of the other 2×2 hybrid optical detector $22_H$. Thus, each 2×2 hybrid optical detector $22_V$, $22_H$ receives light from the local optical oscillator 18 on one of its optical inputs and receives light from the optical communications channel 14 on the other of its optical inputs.

The hybrid optical detectors $22_V$, $22_H$ coherently mix light received at their optical inputs and output digital measures of the resulting mixtures at their electrical outputs. In particular, each hybrid optical detector $22_V$, $22_H$ outputs a complex digital signal value at its electrical outputs. The complex digital signal value is indicative of the complex amplitude of the corresponding polarization component of the modulated optical carrier as frequency down-mixed by the reference optical carrier, i.e., the complex digital signal includes amplitude and phase information. The hybrid optical detectors $22_V$, $22_H$ produce the complex digital signal values by sampling electrical signal levels of optical detectors therein, i.e., at a sampling frequency that is the modulated frequency of the optical carrier generated by the optical transmitter 12 or an integer multiple thereof. In the k-th sampling period, the hybrid optical detectors $22_V$ and $22_H$ output respective complex digital signal values that will be referred to as $Y_V(k)$ and $Y_H(k)$ where $Y_V(k)=\text{Re}[Y_V(k)]+i\cdot\text{Im}[Y_V(k)]$ and $Y_H(k)=\text{Re}[Y_H(k)]+i\cdot\text{Im}[Y_H(k)]$.

The DSP 24 constructs one or more output streams of estimated digital symbols, i.e., D(k)s, from the one or two streams of complex digital data values output by the hybrid optical detectors $22_V$, $22_H$, i.e., the streams of $Y_V(k)$s and $Y_V(k)$s. In the output stream, each D(k) is an estimate of a symbol of a PSK constellation that is carried by the modulated optical carrier at a modulation period "k". The DSP 24 may perform various types of digital processing on the streams of complex digital signal values, i.e., the streams $Y_H(k), Y_H(k+1), \ldots$ and $Y_V(k), Y_V(k+1), \ldots$, to produce the one or more output stream of estimated symbols. The digital processing may compensate for or correct signal degradations that are due to, e.g., PMD, chromatic dispersion, noise, and/or linewidths of the optical transmitter 12 and local optical oscillator 18.

Figure 3B:
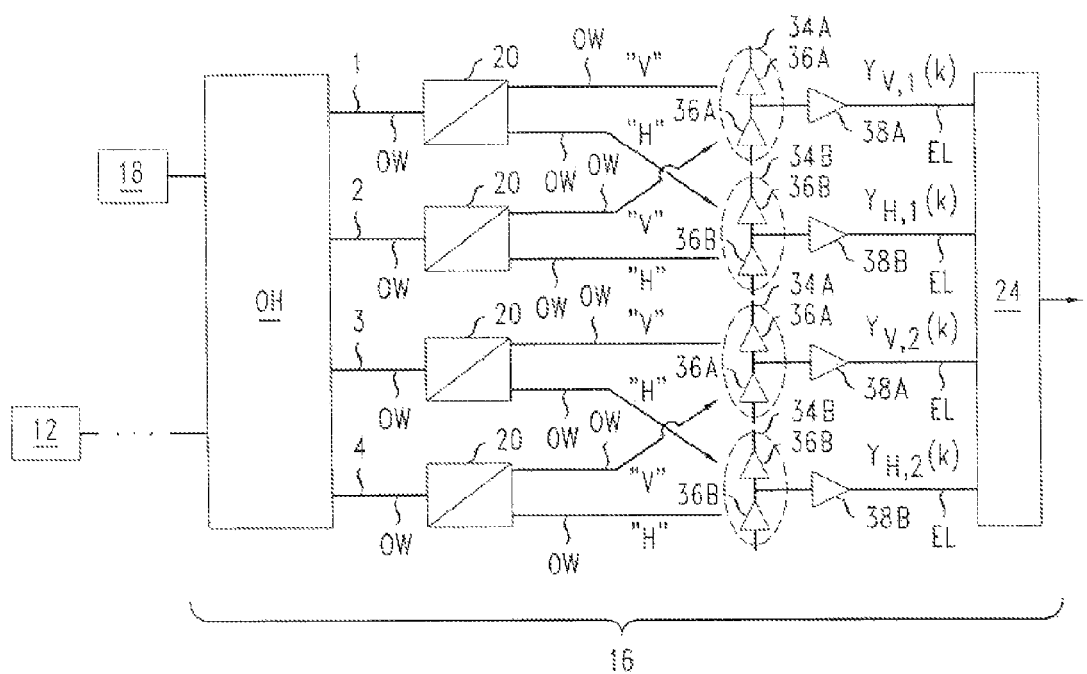
FIG. 3B is a block diagram illustrating an alternate embodiment of the coherent optical receiver of FIG. 2 that includes a single optical hybrid.
Figure 4:
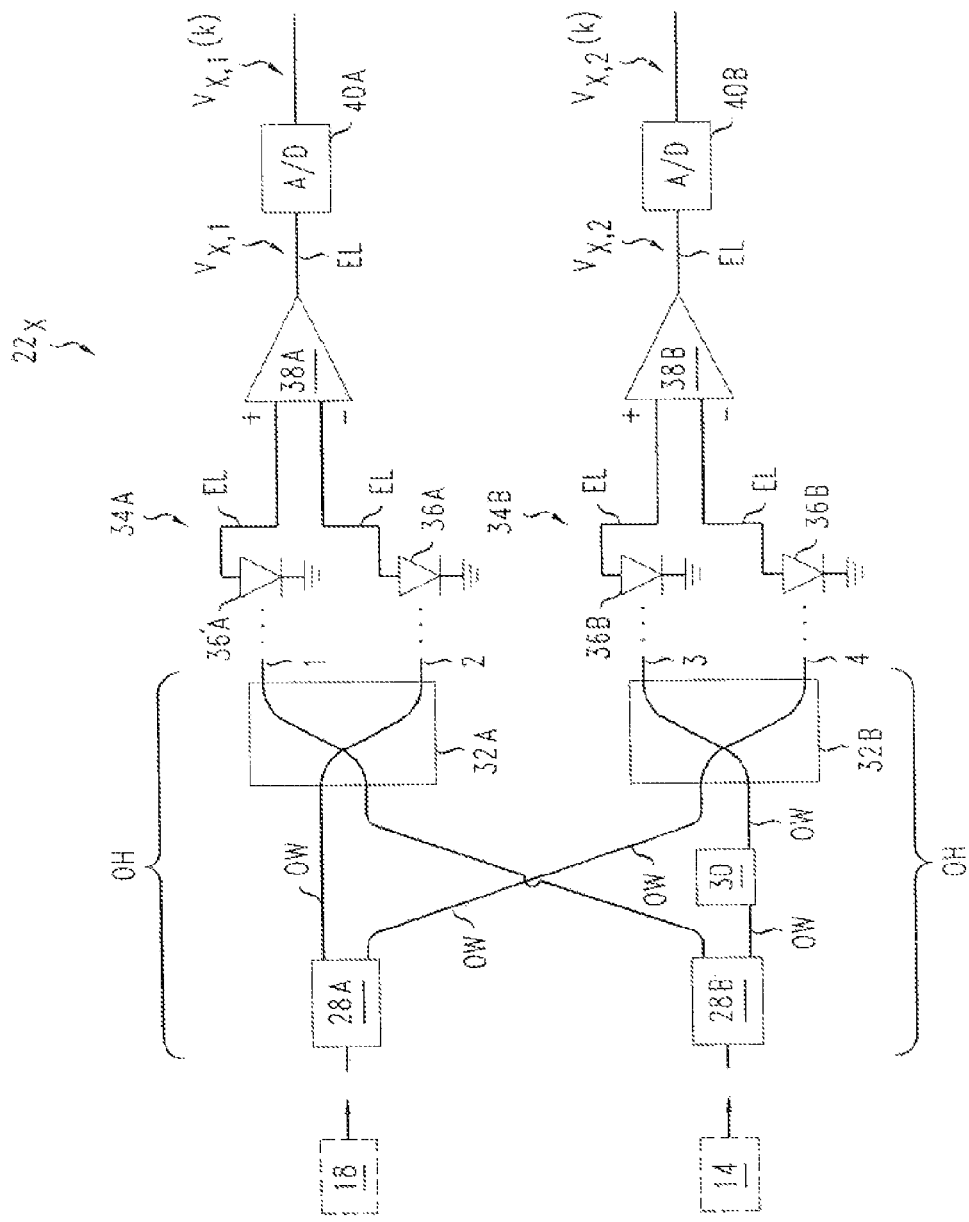
FIG. 4 is a block diagram illustrating one embodiment of the hybrid optical detector of FIG. 3A.

FIG. 4 illustrates a hybrid optical detector $22_X$ that is configured to detect a QPSK modulated optical carrier, e.g., an exemplary embodiment of the hybrid optical detectors $22_V$, $22_H$ of FIG. 3. Here and below, the subscript "X" may refer to either the "H" linear polarization component or the "V" linear polarization component as appropriate. The hybrid optical detector $22_X$ includes an optical hybrid (OH) and first and second optical detectors that measure light intensities output by the optical hybrid OH via digital sampling.

The optical hybrid includes two 1×2 optical intensity splitters 28A, 28B; an optical phase delay 30; and two 2×2 optical mixers 32A, 32B as well as optical waveguides OW connected to various ones of these elements. The optical hybrid produces at two pairs of optical outputs, e.g., the pair (1, 2) and the pair (3, 4), interfered mixtures of the modulated and reference optical carriers. The relative intensities of the mixtures at the two outputs of each pair are sensitive to relative phases of the light interfered. The relative phases of the interfered mixtures are different at the first pair (1, 2) of optical outputs than at the second pair (3, 4) of optical outputs. Exemplary optical hybrids that may be suitable for the optical receivers 16, 16' of FIGS. 1A, 1B, and 2 are described, e.g., in U.S. patent application Ser. No. 11/426,191, entitled "System And Method For Receiving Coherent, Polarization-Multiplexed Optical Signals", which was filed by Noriaki Kaneda and Andreas Leven on Jun. 23, 2006 and is incorporated herein by reference in its entirety.

Each optical detector includes one pair 34A, 34B of matched photodiodes 36A, 36B; a differential amplifier 38A, 38B; and analog-to-digital converters 40A, 40B as well as electrical lines EL interconnecting various ones of these elements. Each optical detector measures the optical signals at one pair of the optical outputs of the optical hybrid OH, i.e., the pair (1, 2) or the pair (3, 4). Indeed, each optical detector produces a sequence of digital electrical values by sampling the intensities of the interfered carriers at one pair of the optical outputs of the optical hybrid.

Each of the 1×2 optical intensity splitters 28A, 28B power splits received light so that about 50 percent of said light is directed to each of its optical outputs. One of the 1×2 optical intensity splitters 28A is connected to receive and power split light from the local optical oscillator 18. The other of the 1×2 optical intensity splitters 28B is connected to receive and power split light of the modulated optical carrier that is received from the optical communications line 14. Each 1×2 optical intensity splitter 28A, 28B connects by an optical waveguide OW to deliver light to an optical input of the 2×2 optical mixer 32A and connects by another optical waveguide OW to deliver light to an optical input of the other 2×2 optical mixer 32B.

Then, the optical phase delay 30 and waveguides OW introduce a relative phase delay, $\Delta$, between the light transmitted from the 1×2 optical splitter 28B to the 2×2 optical mixer 32A and the light transmitted from the 1×2 optical splitter 28B to the 2×2 optical mixer 32B. Typically, the relative phase delay, $\Delta$, is between $\pi/3$ and $2\pi/3$ modulo $N\pi$. The relative phase delay, $\Delta$, is preferably between $3\pi/8$ and $5\pi/8$ modulo $N\pi$ and is more preferably about $\pi/2$ modulo $N\pi$. Here, N is an integer. In contrast, the other optical waveguides OW do not introduce a substantial relative phase delay, i.e., modulo $N\pi$, between the light transmitted from the other optical intensity splitter 28A to the optical mixer 32A and the light transmitted from the other optical intensity splitter 28A to the optical mixer 32B.

Alternately, the optical phase delay 30 may be connected to one of the optical outputs of the 1×2 optical splitter 28A rather than to one of the optical outputs of the 1×2 optical splitter 28B (not shown). Then, the optical phase delay 30 would introduce a relative phase delay, $\Delta$, between light transmitted from the 1×2 optical splitter 28A to the 2×2 optical mixer 32A and the light transmitted from the 1×2 optical splitter 28A to the 2×2 optical mixer 32B. Such a relative phase delay, ^, is between $\pi/3$ and $2\pi/3$ modulo $N\pi$. The relative phase delay, $\Delta$, is preferably between $3\pi/8$ and $5\pi/8$ modulo $N\pi$ and is more preferably about $\pi/2$ modulo $N\pi$. Here, N is an integer. In such embodiments, the optical waveguides OW between the other optical intensity splitter 28B and the optical mixers 32A, 32B introduce substantially no relative phase delay, i.e., modulo $N\pi$, between the light delivered to the two optical mixers 32A, 32B.

In the hybrid optical detector $22_X$, each of the 2×2 optical mixers 32A, 32B is connected to receive the same linear polarization component of the modulated optical carrier and the reference optical carrier. The optical mixers 32A, 32B mix, i.e., interfere, the light received at their optical inputs to produce preselected combinations of said light at their optical outputs. The optical mixers 32A, 32B may be, e.g., conventional or multi-mode interference (MMI) devices.

The 2×2 optical mixers 32A, 32B produce frequency down-mixed versions of the modulated optical carrier. The first optical mixer 32A mixes the light received its optical inputs so that the difference between the light intensities at its optical outputs is indicative of the phase difference, i.e., ($\phi + t \cdot [\omega_{MC} - \omega_{RC}]$), between the light received from the optical communications channel 14 and the light received from the local optical oscillator 18. Here, $\omega_{MC}$ and $\omega_{LC}$ are the frequencies of the modulated optical carrier and the reference optical carrier, respectively, "t" is time, and $\phi$ is a phase offset. In particular, the light intensity at the first optical output 1 of the first optical mixer 32A minus the light intensity at the second optical output 2 of the first optical mixer 32A is proportional to the amplitudes of the light at the two optical inputs of the first optical mixer 32A times a relative phase dependent factor, e.g., $\sin(\phi + t \cdot [\omega_{MC} - \omega_{RC}])$. Similarly, the second optical mixer 32B also mixes the light received at its optical inputs so that the difference between the light intensities at its optical outputs 3, 4 is indicative of the phase difference, i.e., ($\phi + t \cdot [\omega_{MC} - \omega_{RC}]$), between the light received from the optical communications channel 14 and the light received from the local optical oscillator 18. In particular, if the above-discussed relative phase delay $\Delta$ is $\pi/2$ mode $2N\pi$ where N is an integer, then, the light intensity at the first optical output 3 of the second optical mixer 32B minus the light intensity at the second optical output 4 of the second optical mixer 32B is proportional to the amplitudes of the light at the two optical inputs of the second optical mixer 32B times a different relative phase dependent factor, e.g., $\cos(\phi + t \cdot [\omega_{MC} - \omega_{RC}])$.

At each optical output 1-4 of the 2×2 optical mixers 32A, 32B, a corresponding photo-diode 36A, 36B is positioned to detect the intensity of the output light. The photo-diodes form two pairs 34A, 34B of balanced or matched light-sensitivity. In the pairs 34A, 34B, each photo-diode 36A, 36B generates at one input of a differential amplifier 38A, 38B a voltage or a current indicative of the detected light intensity.

Each differential amplifier 38A, 38B outputs an analog voltage, i.e., $V_{X,1}$ or $V_{X,2}$, proportional to a voltage difference applied to its two inputs.

From the analog voltages $V_{X,1}$ and $V_{X,2}$, the first and second A/D converters 40A, 40B produce respective first and second temporal sequences of digital signal values, i.e., $Y_{X,1}(k), Y_{X,1}(k+1), \ldots$ and $Y_{X,2}(k), Y_{X,2}(k+1), \ldots$. To produce these sequences, the A/D converters 40A, 40B sample the analog voltages $V_{X,1}$ and $V_{X,1}$ at sampling rate that may be equal to the symbol/modulation rate or may be an integer multiple of the modulation/symbol rate. The A/D converters 40A, 40B transmit the digital signal values $Y_{X,1}(k)$ and $Y_{X,2}(k)$ to the DSP 24 at the k-th sampling period.

Each complex digital signal value $Y_X(k)=Y_{X,1}(k)+iY_{X,2}(k)$ can be modeled as having the form:

$$Y_X(k)=B_X(k)\cdot\exp[i\cdot\phi_X(k)]+N_X(k) \quad (1)$$

In the above equation, $B_X(k)$ and $\phi_X(k)$ are the amplitude and phase, and $N_X(k)$ is a noise at sampling period "k". The phase $\phi_X(k)$ may be represented as $\Phi_B(k)+\Phi_S(k)+k\cdot T\cdot(\omega_{MC}-\omega_{RC})$ where T is the sampling period, $\Phi_B(k)$ is the phase for a PSK symbol, and $\Phi_S(k)$ is an aggregate phase noise. The aggregate phase noise $\Phi_S(k)$ may obtain substantial contributions due to the line width of the optical transmitter 12 and/or of the local optical oscillator 18 of FIGS. 2-3.

Referring again to FIG. 3, the DSP 24 processes a 2D complex digital vector Y(k), i.e., $Y(k)=[Y_V(k), Y_H(k)]^T$ at each sampling period "k". (Herein, superscripts "†" and "T" mean Hermetian conjugation and matrix transposition, respectively.) The vector Y(k) corresponds to a 2D vector P(k) whose components are the actual modulation phases that the optical receiver 16 is attempting to recover from the received modulated optical carrier. That is, $P(k)=[P_V(k), P_H(k)]^T$ where the phases $P_V(k)$ and $P_H(k)$ were modulated by the optical transmitter 12 onto the respective "V" and "H" polarization components of the optical carrier at a corresponding modulation time. Due to transmission and reception signal degradation, the vector Y(k) often differs from the original vector P(k). The DSP 24 may perform various types of digital processing of the Y(k)s to recover better estimates of the original P(k)s.

FIG. 3B illustrates an alternate embodiment for an optical receiver 16'. The optical receiver 16' is an optical detector that includes a local optical oscillator 18; a single optical hybrid OH; four optical polarization splitters 20, four pairs 34A, 34B of matched or balanced photo-diodes 36A, 36B; four differential amplifiers 38A, 38B; DSP 24; and optical waveguides OW and electrical lines EL connecting said elements. In the optical receiver 16', each element has a similar construction and/or function as the similarly referenced elements of the optical receiver 16 of FIGS. 3A and 4, e.g., elements referenced as 18, 20, 34A, 34B, 36A, 36B, 38A, 38B, OW, EL. Also, the optical receiver 16' receives and outputs similar optical and electronic signals. In addition, the digital sampled values $Y_{V,1}(k), Y_{V,2}(k), Y_{H,1}(k), Y_{H,2}(k)$ that are transmitted to the DSP 24 are similar in the optical receiver 16 and the optical receiver 16'. For that reason, both optical receivers 16, 16' can have substantially identical DSPs 24.

The optical receiver 16' performs polarization splitting at optical outputs 1, 2, 3, 4 of the optical hybrid OH rather than prior to transmitting light thereto. Each optical polarization splitter 20 transmits the two polarization components of the light from one optical output 1, 2, 3, 4 of the optical hybrid OH to different photo-diodes 36A, 36D. For that reason, the optical receiver 16' has a single optical hybrid OH rather than two optical hybrids OH as in the optical receiver 16 of FIGS. 1A and 2.

In the optical receiver 16', the optical hybrid OH may be a bulk optical hybrid rather than a planar optical hybrid OH as illustrated in FIG. 4. Suitable bulk optical hybrids are commercially sold by Optoplex Corporation of 3374-3390 Gateway Boulevard, Fremont, Calif. 94538, United States (online at www.optiplex.com).

With respect to the optical receivers 16, 16' of FIGS. 3A and 3B exemplary types of digital processing therein are illustrated by specific embodiments of DSPs 24A, 24B, 24C, 24D, 24E shown in FIGS. 5A-5E.

Figure 5A:
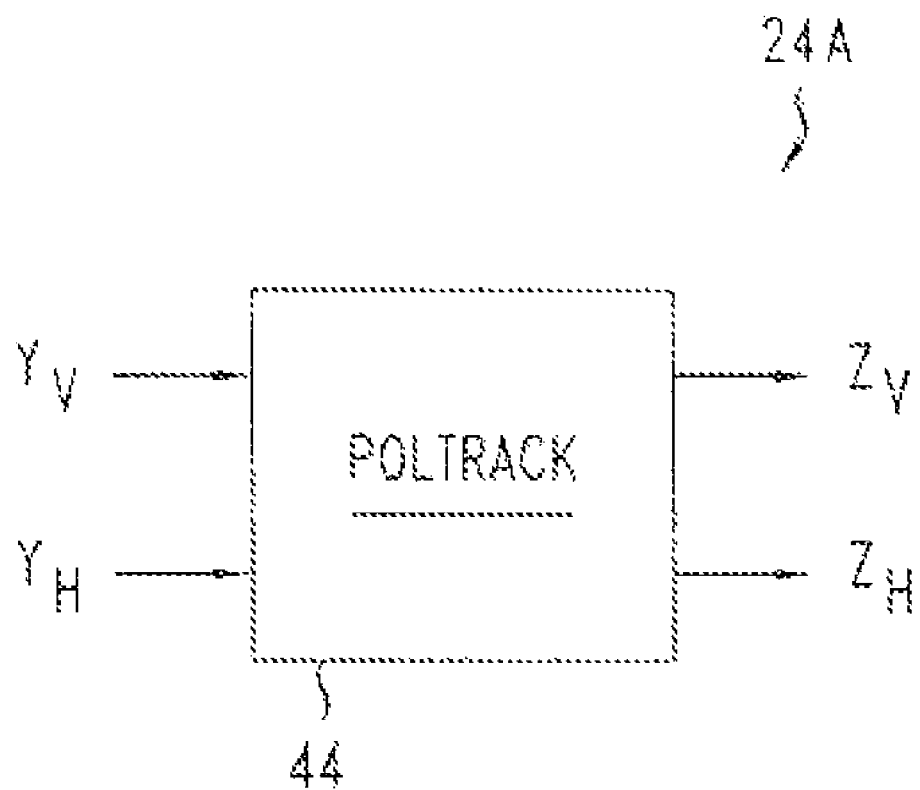
FIG. 5A is a block diagram illustrating an embodiment of the digital signal processors (DSPs) of FIGS. 3A and 3R that compensates for propagation-induced polarization rotations.
Figure 5B:
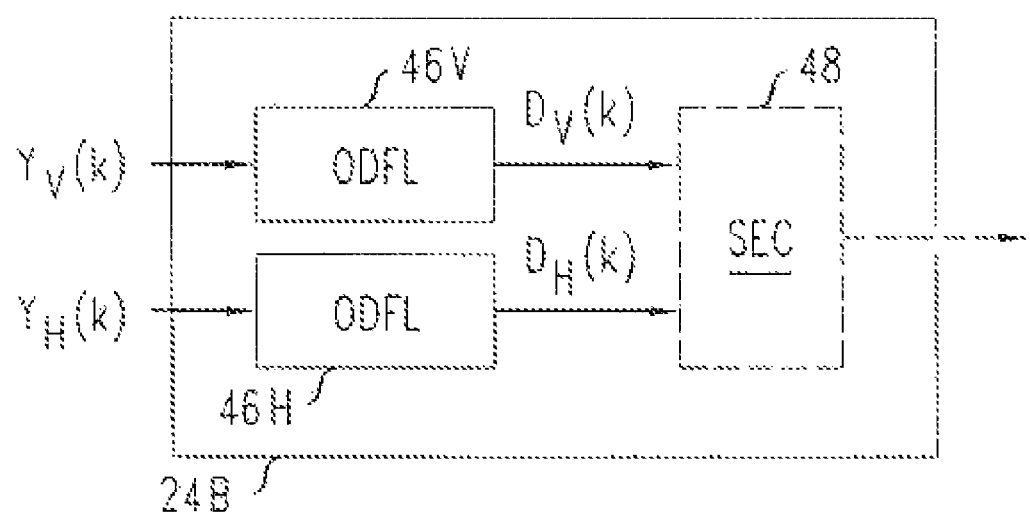
FIG. 5B is a block diagram illustrating an embodiment of the DSPs of FIGS. 3A-3B that provides equalization.
Figure 5C:
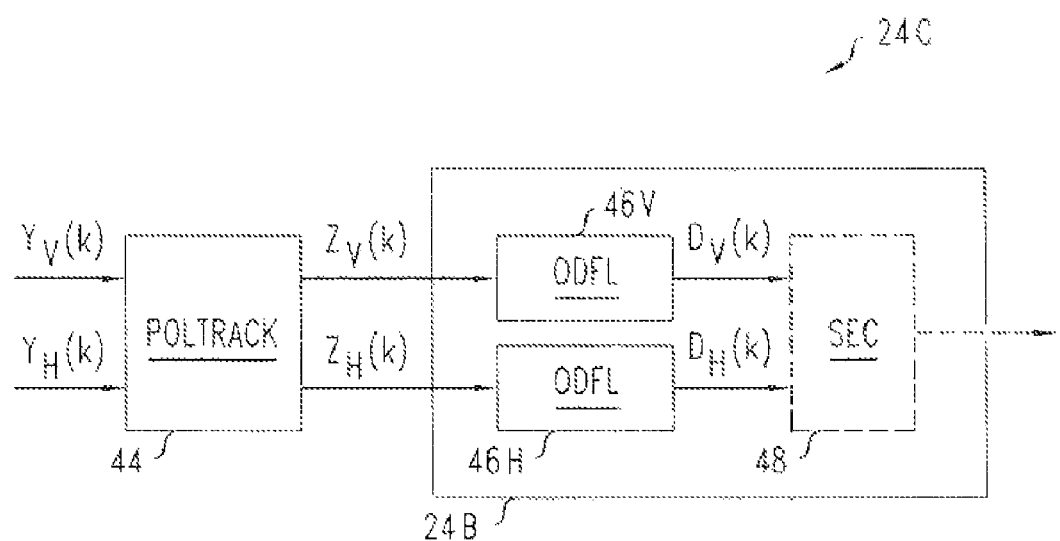
FIG. 5C is a block diagram illustrating an embodiment of the DSP of FIGS. 3A and 3B that both compensates for propagation-induced polarization rotations and provides equalization.

Referring to FIGS. 5A and 5C, the DSPs 24A, 24C include a polarization tracking unit (PolTrack) 44. The PolTrack unit 44 performs a linear transformation on each received 2D complex vector Y(k) individually to produce a 2D complex vector Z(k), i.e., $Z(k)=[Z_V(k),Z_H(k)]^T$. The linear transformation is given by:

$$Z(k)=J(k)\cdot Y(k) \quad (2)$$

Here, the 2×2 matrix J(k) performs a rotation. Thus, the components of J(k) are:

$$J_{11}=J_{22}=\cos[\theta(k)] \text{ and } J_{21}=-J_{12}=\sin[\theta(k)]. \quad (3)$$

The single rotation angle $\theta(k)$ defines the matrix. J(k). The rotation angle $\theta(k)$ is regularly updated to track changes that are caused by a temporal evolution of the optical communications channel 14. The updating of the rotation angle $\theta(k)$ is configured so that the "V" and "H" components of the rotated vector Z(k) and the original phase modulation vector P(k) remain substantially aligned. In particular, the PolTrack unit 44 transforms the Y(k)s to track polarization rotations produced by propagation from the optical transmitter 12 through the optical communications channel 14.

Figure 6:
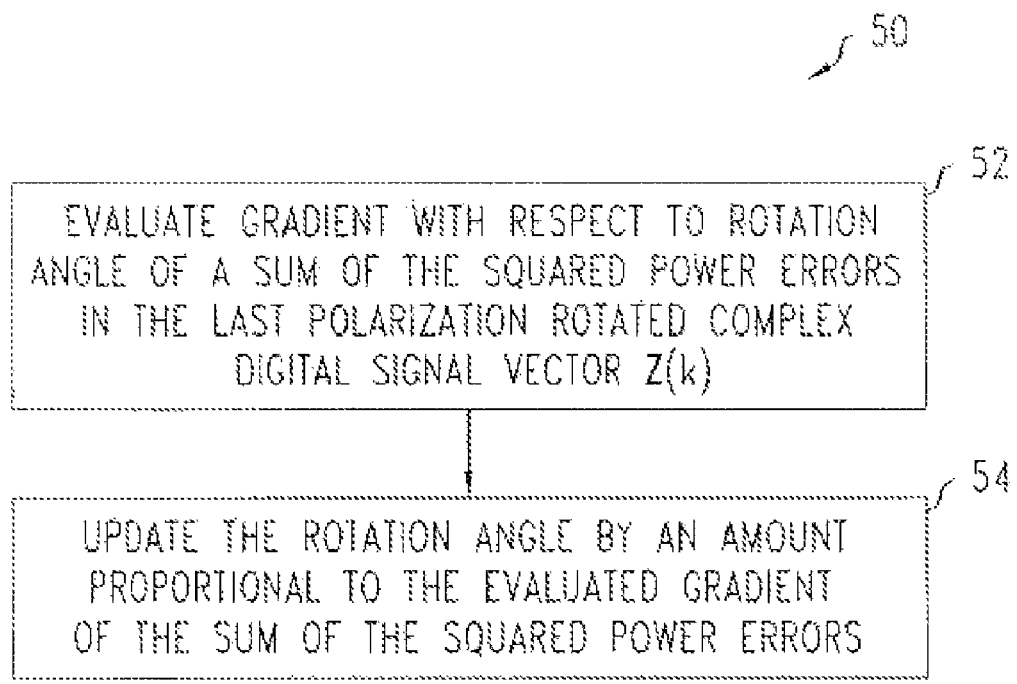
FIG. 6 is a flow chart illustrating a process for updating the rotation angle that defines the polarization rotation dune by the DSP of FIG. 5A.

FIG. 6 illustrates a method 50 for dynamically updating the rotation angle $\theta(k)$. For example, the PolTrack unit 44 may be configured to perform the updating method 50. The PolTrack unit 44 may perform the method 50 during each sampling period during ordinary operation or may perform the method 50 to update $\theta(k)$ less frequently.

For each update of the rotation angle $\theta(k)$, the method 50 includes evaluating a gradient with respect to the rotation angle $\theta(k)$ of a sum of the squared power errors in the components of the 2D complex digital signal vector Z(k) last produced by the PolTrack unit 44 (step 52). The "V" and "H" components of Z(k) have respective power errors $e_V(k)$ and $e_H(k)$, which are given by:

$$e_V(k)=|P_V(k)|^2-|Z_V(k)|^2=1-|Z_V(k)|^2 \text{ and}$$

$$e_H(k)=|P_H(k)|^2-|Z_H(k)|^2=1-|Z_H(k)|^2. \quad (4)$$

Above, the second forms for the power errors follow, because $P_V(k)$ and $P_H(k)$ are phases up to a constant amplitude, which has been taken as one. From the above definition of Z(k), the $\theta(k)$-gradients of $e_V(k)$ and $e_V(k)$ can be shown to satisfy:

$$\begin{aligned}\partial_{\theta(k)}[e_H(k)] &= -\partial_{\theta(k)}[e_V(k)] \\ &= [|Y_H(k)|^2-|Y_V(k)|^2]\cdot\sin[2\theta(k)] - \\ &\quad 2\cdot Re[Y_V(k)\cdot Y_H^*(k)]\cdot\cos[2\theta(k)].\end{aligned} \quad (5)$$

The gradient with respect to the rotation angle $\theta(k)$ of the sum of the squared power errors of the 2D complex vector Z(k) is $\partial_\theta[(e_H(k))^2+(e_V(k))^2]$. From eqs. (4)-(5), this expression may be seen to satisfy:

$$\partial_\theta[(e_H(k))^2+(e_V(k))^2]=\gamma[|Z_V(k)|^2-|Z_H(k)|^2]\partial_\theta[e_H(k)]. \quad (6)$$

The performance of step 52 may include evaluating $\partial_\theta[e_H(k)]$ with eq. (5) and the, using the value of $\partial_\theta[e_H(k)]$ to evaluate the right hand side of eq. (6).

For each update of the rotation angle $\theta(k)$, the method 50 includes updating the last rotation angle $\theta(k)$ by an amount that is proportional to the evaluated gradient of the squared power errors for the two components of the last evaluated vector Z(k) (step 54). From above eq. (6), the step 54 includes performing on the rotation angle the iterative update:

$$\theta(k+1)=\theta(k)+\gamma[|Z_V(k)|^2-|Z_H(k)|^2]\partial_\theta[e_H(k)]. \quad (7)$$

Here, $\gamma$ is a preselected positive number that fixes the size of an update step. From eq. (7), the update step 54 involves adding a correction to $\theta(k)$, wherein the correction is proportional to a difference between $|Z_V(k)|$ and $|Z_H(k)|$, i.e., the update is proportional to $|Z_V(k)|−|Z_H(k)|$. The updated rotation angle will be used by the PolTrack unit 44 to rotate the next complex digital signal vector Y(k) that is received from the hybrid optical detectors $22_V$, $22_H$.

The above method 50 updates the rotation angle θ(k) in a manner configured to equalize energies of the polarization components of the vector Z(k) produced by the PolTrack unit 44.

In addition, neither the polarization tracking transformation of eq. (1) nor the update method 50 involve equalization. For example, each iterative update of the rotation angle θ(k) is based on energy errors of one earlier sampling period. Also, the rotation of eq. (1) does not involve the equalization of individual polarization components of the complex digital signal vector Y(k). In particular, the performance of the method 50 does not includes cross equalization of the two polarization components $Y_V(k)$ and $Y_H(k)$ of the complex digital signal vector Y(k) together. During performance of the method 50, neither polarization component of the vector Y(k) gets replaced by a weight sum of the component of the digital signal vector Y(k) at earlier sampling times wherein the sum includes the other polarization component. Due to the lack of a reliance on equalization, the PolTrack unit 44 can be a simpler and faster hardware device.

As illustrated by eqs. (5) and (7), the method 50 does not require knowledge of the specific phase data being transmitted. For that reason, the method 50 may be implemented without transmission of a preselected sequence of training symbols. Indeed, the PolTrack unit 44 may effectively implement the method 50 whether the symbol sequences modulated onto the "V" and "H" polarization components are the same or independent sequences. With the method 50, the PolTrack unit 44 can operate effectively when the optical transmitter 12 polarization multiplexes data onto the transmitted optical carrier and can otherwise aid to implement a polarization-diverse embodiment of the optical receiver 16.

Referring to FIG. 5B, the DSP 24B includes two optical linear differential filter (OLDF) equalizers 46V, 46H. Optionally, the DSP 24B includes a symbol estimate combiner (SEC) 48, e.g., for embodiments of optical receivers 16, 16' configured to receive modulated optical carriers on which data is not polarization multiplexed. The ODLF equalizer 46V processes the sequence of 2D complex digital $Y_V(k)$s to produce a sequence of complex digital $D_V(k)$s in which the temporal broadening effects of optical inter-symbol interference (OISI) are reduced. The ODLF equalizer 46H processes the sequence of complex digital $Y_H(k)$s to produce a sequence of complex digital $D_H(k)$s in which the temporal broadening effects of OISI are reduced. The ODLF equalizers 46V, 46H are illustrated in FIG. 7 where "X" refers to the "V" or "H" linear polarization components as appropriate.

Figure 7:
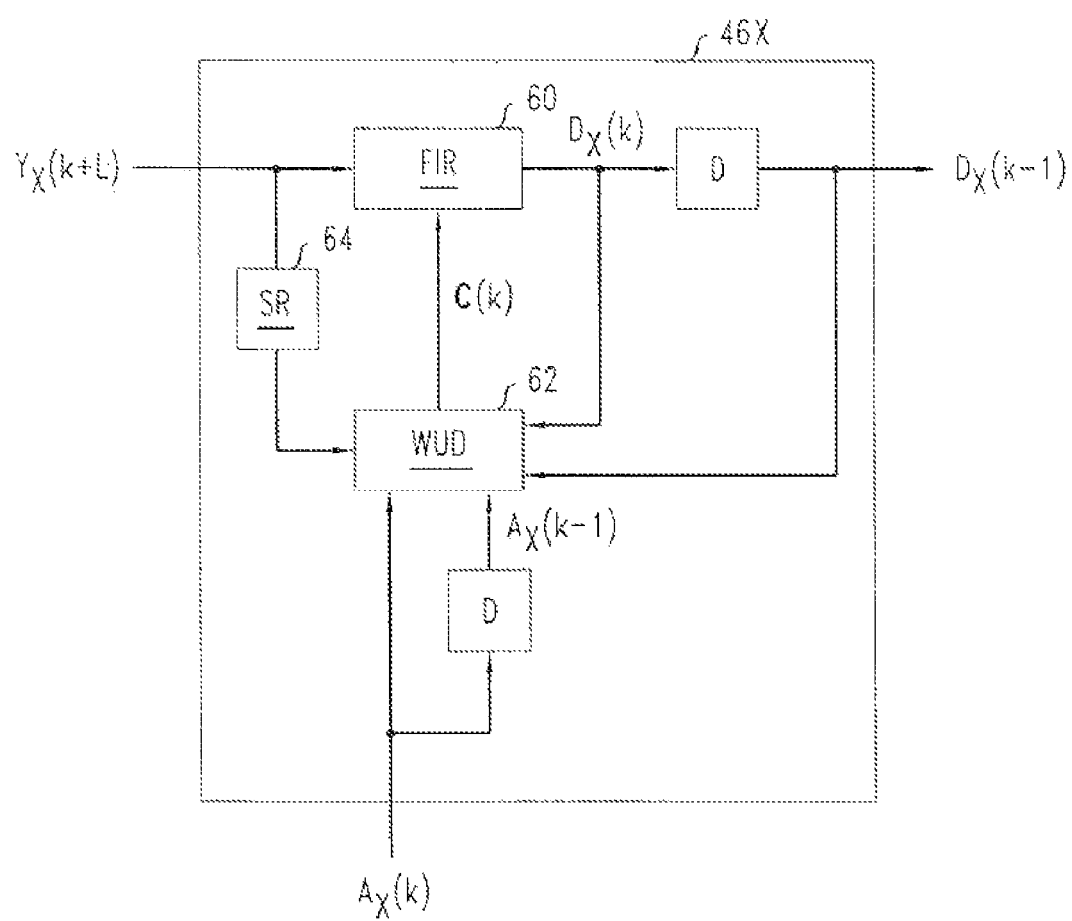
FIG. 7 is a block diagram illustrating one structure for the ODLF equalizers in the DSP of FIG. 5B.

FIG. 7 illustrates an exemplary structure for the ODLF equalizer 46X. The ODLF equalizer 46X includes a finite impulse response (FIR) filter 60, a weight updating device (WUD) 62, one sample period delays (D), and a serial-load parallel-output shift register (SR) 64. From the $Y_X(k)$s, the FIR filter 60 produces equalized complex $D_X(k)$s via method 70 of FIG. 8. In addition, the WUD 62 performs updates of the (2L+1) complex coefficients of the FIR filter 60, i.e., the coefficients $C_{X,-L}(k), \ldots, C_{X,0}(k), \ldots, C_{X+L}(k)$, via a method 82 of FIG. 9. Such updates of the coefficients of the FIR filter 60 are done regularly so that equalization performed by the ODLF equalizer 46X tracks changes in the optical communications channel 14.

Figure 8:
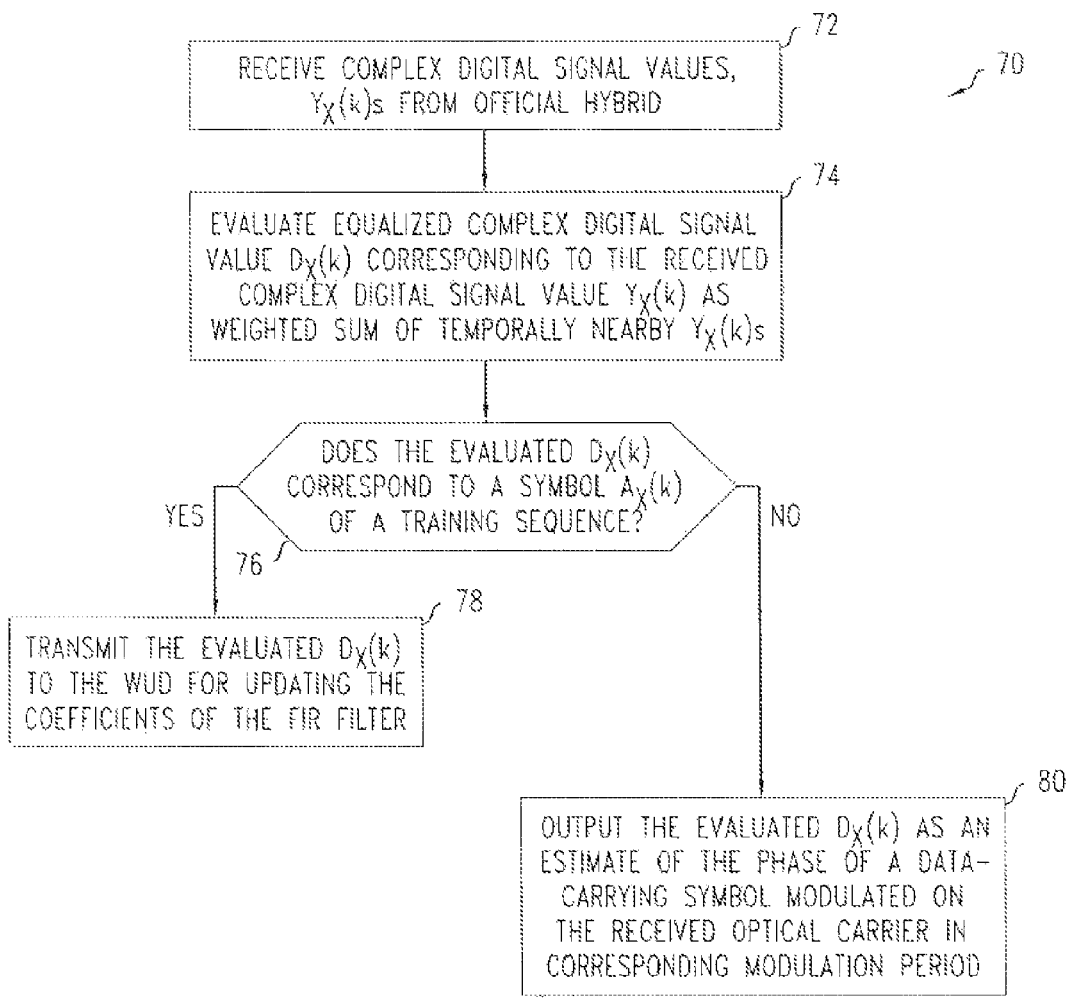
FIG. 8 is a block diagram illustrating one method of operating the ODLF equalizer illustrated by FIG. 7.

FIG. 8 describes the method 70 for performing equalization with the ODLF 46X of FIG. 7. The method 70 includes serially receiving the sequence of the appropriate complex digital signal values, i.e., the $Y_X(k)$s, from an optical hybrid OH in the optical receiver 16, 16' of FIG. 3A or 3B (step 72). The method 70 includes evaluating an equalized complex digital signal value $D_X(k)$ for each received complex digital signal value $Y_X(k)$, e.g., one $D_X(k)$ may be evaluated for each of the $Y_X(k)$s (step 74). The evaluating step 74 involves forming a weighted average of (2 L+1) of the consecutively received complex digital signal values. That, is the sum is a weighted average over the (2 L+1) temporally neighboring values, e.g., the values $Y_X(k−L), \ldots, Y_X(k+L)$. Here, L is a positive integer defining the width of the equalization region. In particular, the FIR filter 60 may evaluate each equalized complex digital signal value $D_X(k)$ as the weighted average defined by:

$$D_X(k)=C_X(k)^\dagger \cdot Y_X(k)=\Sigma^L_{j=-L}[C_{X,j}{}^*(k) \cdot Y_X(k-j)]. \tag{8}$$

In above eq. (8), the (2L+1) dimension complex vectors $C_X(k)$ and $Y_X(k)$ are given by:

$$C_X(k)=[C_{X,-L}(k), \ldots, C_{X,+L}(k)]^T \text{ and} \tag{9}$$

$$Y_X(k)=[Y_X(k+L), \ldots, Y_X(k-L)]^T. \tag{10}$$

In eqs. (9) and (10), the complex weight vector $C_X(k)$ has components, i.e., $C_{X,-L}(k), \ldots, C_{X,+L}(k)$, which are the weight coefficients of the FIR filter 60. In light of the above disclosure, one of skill in the art would be able to make fabricate an exemplary FIR filter 60 suitable to form the weighted average of eq. (8). The method 70 also includes determining whether the equalized complex digital signal value(s) evaluated for each modulation period, i.e., one or more $D_X(k)$s, correspond(s) to a modulation phase $P_X(k)$ of a symbol in a training sequence (step 76). If the evaluated complex digital signal value(s) correspond(s) to an estimate of a modulation phase $P_X(k)$ of a symbol in a training sequence, the method 70 includes transmitting the evaluated equalized complex digital signal value(s), i.e., the one or more $D_X$s, to the WUD 62 for use in updating the weight coefficients of the FIR filter 60 (step 78). Otherwise, the evaluated equalized complex digital signal value(s) form(s) one or more estimates of a modulation phase factor $P_X(k)$ for a data-carrying symbol. In that case, the method 100 then, includes outputting the evaluated equalized complex digital signal value(s), i.e., the one or more $D_X(k)$s, for use in estimating the data-carrying symbol corresponding to the modulation phase factor $P_X(k)$ (step 80).

If the optical transmitter 12 does not modulate independent sequences of PSK symbols onto the "V" and "H" polarization components of the optical carrier, the optional SEC 48, as shown in FIG. 5B, may combine or compare the estimated modulation phases from the two ODLF equalizers 46V, 46H, e.g., to provide polarization diversity. For example, the processing by the SEC 48 may obtain an improved estimate D(k) for the actual symbol that was modulated onto the optical carrier during the corresponding modulation period. The optional SEC 48 may also combine such estimated phases for modulated symbols over more than one sampling period that corresponds to the same modulation period to produce the improved estimate D(k) for the actual modulated symbol value.

FIG. 9 describes the method 82 for updating the coefficients of the FIR filter 60 of FIG. 7.

The method 82 includes evaluating in the WUD 62 of FIG. 7 a differential equalization error $E_X(k)$ that measures the error between estimated and actual values of training symbols (step 84). The WUD 62 obtains the estimated values output by the FIR filter 60, i.e., at above-described step 78 of the method 70. The WUD 62 may obtain the actual modulation phases $P_X(k)$ and $P_X(k-1)$, which have preselected values, from the DSP 24B. Both the $D_X(k)$s and $P_X(k)$s are, e.g., N-th roots of unity, wherein N is the size of PSK constellation. One exemplary definition for such a differential equalization error $E_X(k)$ is given by:

$$E_X(k) = P_X(k) \cdot P_X^*(k-1) - D_X(k) \cdot D_X(k-1) \quad (11)$$
$$= P_X(k) \cdot P_X(k-1)^* -$$
$$C_X(k)^\dagger \cdot Y_X(k) \cdot Y_X(k-1)^\dagger \cdot C_X(k-1).$$

Since the error $E_X(k)$ is a temporal differential function, a small mismatch between the frequency, $\omega_{MC}$, of modulated optical carrier and the frequency, $\omega_{RC}$, of the reference optical carrier typically will not typically lead to a large magnitude for $E_X(k)$. For that reason, such a differential error is believed to provide an adequate measure of equalization-related mismatches even in the absence optical phase or frequency locking between the modulated optical carrier and the reference optical carrier.

Next, the method 82 includes determining updated values for the (2 L+1)-dimensional complex weight vector $C_X(k)$. The updated values are based on the evaluated differential equalization error $E_X(k)$ and already estimated and/or received digital signal values (step 86). For example, the step 82 may update the complex weight vector $C_X(k)$ at each modulation period or at each sampling period as follows:

$$C_X(k+1) = C_X(k) - \beta \cdot E_X(k)^* \cdot D_X^*(k-1) \cdot Y_X(k). \quad (12)$$

Here, $\beta$ is a positive number defining the update step size.

The method 82 includes loading into the FIR filter 60 the updated complex weight coefficient vector $C_X(k+1)$ that was found at the step 86 (step 88). The loaded weight coefficients will then, be used for the next digital equalization performed by the FIR filter 60.

The method 82 includes determining whether the equalized complex digital signal value next to be outputted by the FIR filter 60, e.g., $D_X(k+1)$, corresponds to an estimated modulation phase of another training symbol, i.e., a training symbol for a new modulation period (step 90). If the next outputted complex digital value does or will correspond to such a new training symbol, the method 82 includes looping back 92 to again perform the step 84. Such loop backs 92 can improve values of the weight coefficients loaded onto the FIR filter 60, e.g., by iteratively reducing the above-described differential equalization error. Otherwise, the method 82 includes outputting the equalized complex digital signal value $D_X(k+1)$ as an estimated modulation phase for a data-carrying symbol carried by the modulated optical carrier, i.e., as at the step 80, and then, returning the ODLF equalizer 46X to the mode of performing equalization according to the method 70 of FIG. 8 (step 94).

In the method 80 for updating the complex weight coefficients of the FIR filter 60, the differential error $E_X(k)$ has several desirable properties. First, the error $E_X(k)$ is independent of any constant phase shift between the modulated optical carrier and the reference optical carrier. Second, the error $E_X(k)$ is substantially independent of small line width-induced phase rotations provided that the sampling period is sufficiently short. For these reasons, the ODLF equalizer 46X can compensate OISI induced by the optical communications channel 14 even in the absence of optical phase locking between the received modulated optical carrier and the reference optical carrier. It is often desirable to avoid such an OPLL, because implementations of OPLLs can be difficult to achieve at optical communications frequencies. The adaptive equalizer 46X provides one way to provide for coherent optical detection without such an undesirable OPLL.

FIG. 5C illustrates the DSP 24C, which combines the PolTrack unit 44 of FIG. 5A and the DSP 24B of FIG. 5B thereby providing compensation for both polarization rotation and OISI that occur in the optical communications channel 14. In the DSP 24C, the PolTrack unit 44 functions as described with respect to FIG. 5A. In the DSP 24C, each ODLF equalizer 46V, 46H functions like the ODLF equalizer 46X of FIGS. 5B and 7-9, wherein digital signal values $Z_V(k)$ and $Z_H(k)$ from the PolTrack unit 44 replace the digital signal values $Y_V(k)$ and $Y_H(k)$ from the hybrid optical detectors $22_V$, $22_H$.

Combining the PolTrack unit 44 and the DSP 24B can also provide some level of compensation for PMD-induced phase shifts between the "V" and "H" polarization components of the modulated optical carrier. The PolTrack unit 44 cannot of itself compensate for such polarization-dependent phase shifts. Such phase shifts between the "H" and "V" polarization components may be produced as the modulated optical carrier propagates through the optical communications channel 14. The independent equalization of the "H" and "V" polarization components in the ODLF equalizer 46H and the ODLF equalizer 46V, respectively, may provide sufficient compensation for such polarization-dependent phase shifts.

Figure 5D:
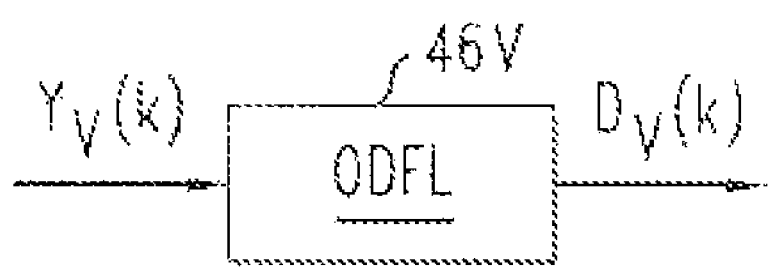
FIG. 5D is a block diagram illustrating an embodiment of the DSP of FIGS. 3A and 3B that provides equalization in a optical communications system without polarization multiplexing.

FIG. 5D illustrates the DSP 24D, which includes only one ODFL equalizer 46V of FIG. 5B. In the DSP 24D, the ODLF equalizer 46V functions as in the ODLF equalizer 46X of FIG. 5B. The DSP 24D can correct for OISI in the optical communications channel 14 when the modulated optical carrier is not polarization multiplexed.

Figure 5E:
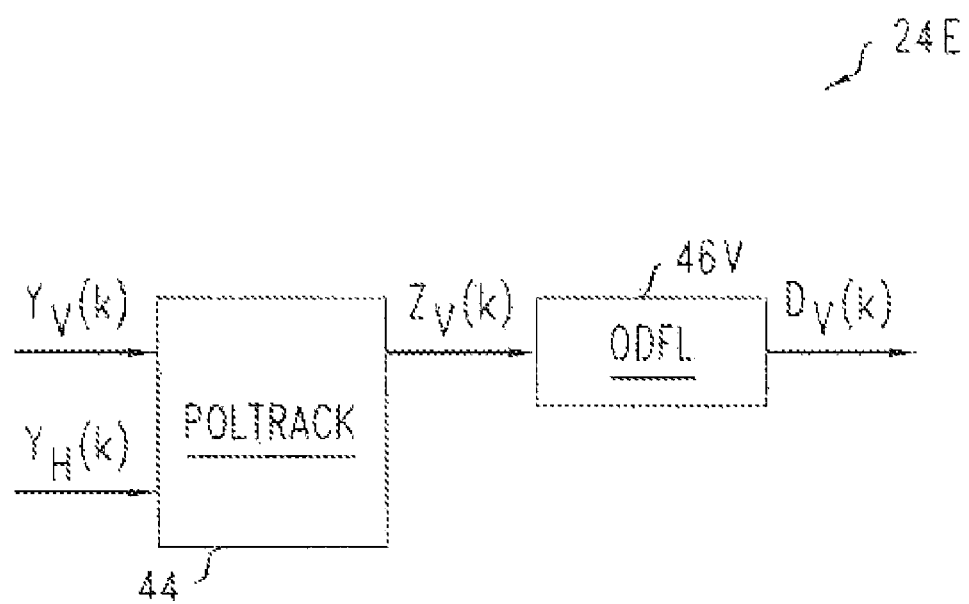
FIG. 5E is a block diagram illustrating an embodiment of the DSP of FIGS. 3A and 3B that corrects propagation-induced polarization rotations and provides equalization in a optical communications system without polarization multiplexing.

FIG. 5E illustrates the DSP 24E, which includes the PolTrack unit 44 and one ODFL equalizer 46V shown in FIG. 5C. In the DSP 24E, the PolTrack unit 44 and ODLF equalizer 46V functions as in the DSP 24C of FIG. 5C. The DSP 24E may correct polarization rotations and OISI in some optical communications channels 14 when the modulated optical carrier is not polarization multiplexed.

Referring again to FIG. 2, some optical communications channels 14 may produce high levels of optical noise, e.g., due to in-line optical amplifiers. In these optical communications channels 14, equalization based on differential phase errors, i.e., based on the $E_X(k)$s, may not adequate optimal equalization. For such optical communications channels 14, the ODLF equalizer 46X of FIG. 7 may be coupled serially to the input of another equalizer. This other equalizer could be configured to recursively estimate the phases modulated onto the received optical carrier based on the equalized complex signal values output by the ODLF equalizer 46X, i.e., the $D_X(k)$s. In such embodiments, the recursively estimated phases might also be feed back to the WUD 62 for use in updating the weight coefficients of the FIR filter 60. Digital processing methods and apparatus for such recursive estimates of modulation phases are described, e.g., in U.S. patent application Ser. No. 11/483,280, entitled "Recursive Phase Estimation for a Phase-Shift-Keying Receiver", which was filed on Jul. 7, 2006 by Ut-Va Koc. This U.S. patent application is incorporated by reference herein in its entirety.

In light of the description and drawings herein, it may be evident to one of skill in the art that the DSP 24 of FIG. 3 could use a different method to compensate polarization rotation and/or reduce the OISI that has been produced by the optical communications channel 14. For example, such other methods could use different error measures than those described with respect to FIGS. 5A-5C and 6-9.

In some embodiments of the DSPs 24 of FIGS. 3A and 3B, a first or second stage of signal processing may include a correction for phase errors caused by the frequency offset between the modulated optical carrier and the reference optical carrier. Devices for performing such correction may be useful in the optical receivers 16, 16' and are described, e.g., U.S. patent application Ser. No. 11/644,536 entitled "Frequency Estimation in An Intradyne Optical Receiver", which is being filed by Andreas Leven et al on the same date as this patent application and is incorporated herein by reference in its entirety.

From the above disclosure, the figures, and the claims, other embodiments will be apparent to those of skill in the art.

I claim:

1. An apparatus, comprising:
    an optical receiver configured to recover data PSK modulated onto a received optical carrier, the optical receiver comprising:
        an optical detector being configured to produce a sequence of vectors having first digital electrical signal components, each first digital electrical signal component being indicative of a value of one polarization component of the received optical carrier at a corresponding sampling time; and
        a digital signal processor being connected to receive the first digital electrical signal components and being configured to equalize the first digital electrical signal components in a manner responsive to differential phase errors between successive ones of the first digital electrical signal components, the being configured to equalize the first digital electrical signal components including being configured to form weighted sums of successive ones of the first digital electrical-signal components.

2. The apparatus of claim 1,
    wherein the optical detector is configured to produce second digital electrical signal components of the vectors, each second digital electrical signal component being indicative of a value of another polarization component of the received optical carrier at the corresponding sampling time; and
    wherein the digital signal processor is configured to equalize the second digital electrical signal components in a manner responsive to differential phase errors between successive ones of the second digital electrical signal components.

3. The apparatus of claim 1, wherein the digital signal processor comprises a device configured to function as a FIR filter that equalizes the first digital electrical signal components by producing a weighted sum of $(2L+1)$ successive ones of the first digital electrical signal components, L being greater than or equal to one.

4. The apparatus of claim 3, wherein the digital signal processor further comprises a weight updating device that is configured to update weights defining the sum based on the differential phase errors.

* * * * *